(12) United States Patent
Grant et al.

(10) Patent No.: US 11,552,780 B2
(45) Date of Patent: Jan. 10, 2023

(54) HOMOMORPHIC ONE-TIME PAD ENCRYPTION

(71) Applicant: Theon Technologies, Inc., Newport Beach, CA (US)

(72) Inventors: Robert Edward Grant, Laguna Beach, CA (US); Kristine Romine, Phoenix, AZ (US)

(73) Assignee: Theon Technologies, Inc., Newport Beach, CA (US)

( * ) Notice: Subject to any disclaimer, the term of this patent is extended or adjusted under 35 U.S.C. 154(b) by 218 days.

(21) Appl. No.: 17/132,128

(22) Filed: Dec. 23, 2020

(65) Prior Publication Data

US 2022/0200785 A1    Jun. 23, 2022

(51) Int. Cl.
*H04L 9/00*    (2022.01)
*H04L 9/08*    (2006.01)
*H04L 9/14*    (2006.01)
*G06F 21/60*   (2013.01)

(52) U.S. Cl.
CPC ............ *H04L 9/008* (2013.01); *G06F 21/602* (2013.01); *H04L 9/0861* (2013.01); *H04L 9/14* (2013.01)

(58) Field of Classification Search
CPC ......... H04L 9/008; H04L 9/0861; H04L 9/14; G06F 21/602
See application file for complete search history.

(56) References Cited

U.S. PATENT DOCUMENTS

| 6,751,736 | B1  |   | 6/2004  | Bowman       |              |
|-----------|-----|---|---------|--------------|--------------|
| 10,230,703| B1  | * | 3/2019  | Lepore       | H04L 9/0891  |
| 11,443,310| B2  | * | 9/2022  | Bol          | H04L 9/14    |
| 2003/0115449 | A1 | * | 6/2003 | Yochim       | H04L 9/12    |
|           |     |   |         |              | 713/153      |
| 2004/0096056 | A1 | * | 5/2004 | Boren        | H04L 9/0662  |
|           |     |   |         |              | 380/28       |
| 2004/7009605 |    |   | 5/2004  | Boren        |              |
| 2014/0112469 | A1 |   | 4/2014 | Layne        |              |
| 2017/0310650 | A1 | * | 10/2017 | McMullen    | G06F 21/10   |
| 2018/0101322 | A1 |   | 4/2018 | Cheriton     |              |
| 2018/0131526 | A1 | * | 5/2018 | Ellingson    | H04L 63/0823 |
| 2020/0293212 | A1 | * | 9/2020 | Narayanamurthy | G06F 3/0608 |

FOREIGN PATENT DOCUMENTS

WO    0065768    11/2000
WO    2019110955    6/2019

OTHER PUBLICATIONS

International search report for related PCT application No. PCT/US2021/064756 dated Apr. 14, 2022. 9 pages.

\* cited by examiner

*Primary Examiner* — Meng Li
(74) *Attorney, Agent, or Firm* — Fish IP Law, LLP

(57) ABSTRACT

A system for securing a data set include a computing device that provides access to portions of a data set to different users, and can encrypt the portions by generating encryption keys for each portion using a single mathematical function. The keys are generated by applying a starting point and length to a solution of the mathematical function. The process to generate the decryption keys are provided to the authorized users so that they can view and manipulate only the data set portions they are authorized to access.

5 Claims, 5 Drawing Sheets

HOMOMORPHIC ONE-TIME PAD ENCRYPTION

FIELD OF THE INVENTION

The field of the invention is data encryption and security.

BACKGROUND

The background description includes information that may be useful in understanding the present invention. It is not an admission that any of the information provided herein is prior art or relevant to the presently claimed invention, or that any publication specifically or implicitly referenced is prior art.

Securing shared data sets presents problems that are not present for single-user data sets. For shared data sets, a system must be able to secure the data while being flexible enough to allow users proper access to the data. Unfortunately, this creates complexity where the system must juggle many separate keys for all users, and be constantly updating each.

One-time pads for passwords are known to be completely secure. However, the use of one-time pads requires that the keys be shared between the parties ahead of time and only be used once. This means that for many exchanges, the parties must have a priori storage of many keys. The difficulties associated with these requirements has resulted in favoring the public key cryptography schemes over one-time pad schemes.

Others have attempted to solve this problem.

WO 20190110955 to Bryant discusses the use of a one-time pad for password generation. However, the solution in Bryant requires the storage of all of the passwords in a large pad, which is resource intensive.

WO 00/65768 to Persson discusses determining a maximum key length. However, the generation of the shortened key in Persson is performed in such a way that a function can still only be used once.

Thus, there is still a need for a system that securely protects a shared data set while adeptly providing the correct access to its users.

SUMMARY OF THE INVENTION

The inventive subject matter provides apparatus, systems and methods in which a computing device grants access to multiple users to add or modify data within a data set without allowing any of the users access to more data than they have permission.

The system of the inventive subject matter includes a computing device that controls access to a data set. The data set is encrypted.

Upon a request by an authorized first user, the computing device can grant access to a corresponding first portion of the data set to the first user. At some point, upon a request by an authorized second user, the computing device can grant access to a corresponding second portion of the data set to the second user. The first portion accessible by the first user and the second portion accessible by the second user share an overlapping portion of the data file. In other words, there is a portion of the data file that is accessible by both the first user and the second user.

To govern access to the various data portions, the computing device encrypts the first portion (minus the overlapping portion) with a first encryption key. The computing device encrypts the second portion (minus the overlapping portion) with a second encryption key, and then encrypts the overlapping portion with a third key. In this scenario, the first user is then provided with the first and third keys (or with the method of how to derive them) and the second user is provided with the second and third keys (or with the method of how to derive them) so that they can access and modify or add to their corresponding data portions accordingly.

In embodiments where the users derive their keys, each user has to derive the key that corresponds to their respective portion as well as any keys that apply to any shared portions.

In embodiments of the inventive subject matter, each of the first, second and third keys are derived from an irrational number.

In variations of these embodiments, the irrational number is derived for a mathematical function that is known to the first and second users and the computing device. In these embodiments, the keys can be derived by solving the mathematical function to obtain the irrational number and then applying a starting point and length to the decimals of the mathematical function.

In variations of these embodiments, the mathematical function involves calculating, by the computing device, the square root of a non-perfect square number.

It is contemplated that the data set can be any data set where a plurality of users can contribute data to and/or modify some of the data stored in the data set. Examples of contemplated data sets include voter registration databases, collaborative work data, shared documents, etc.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
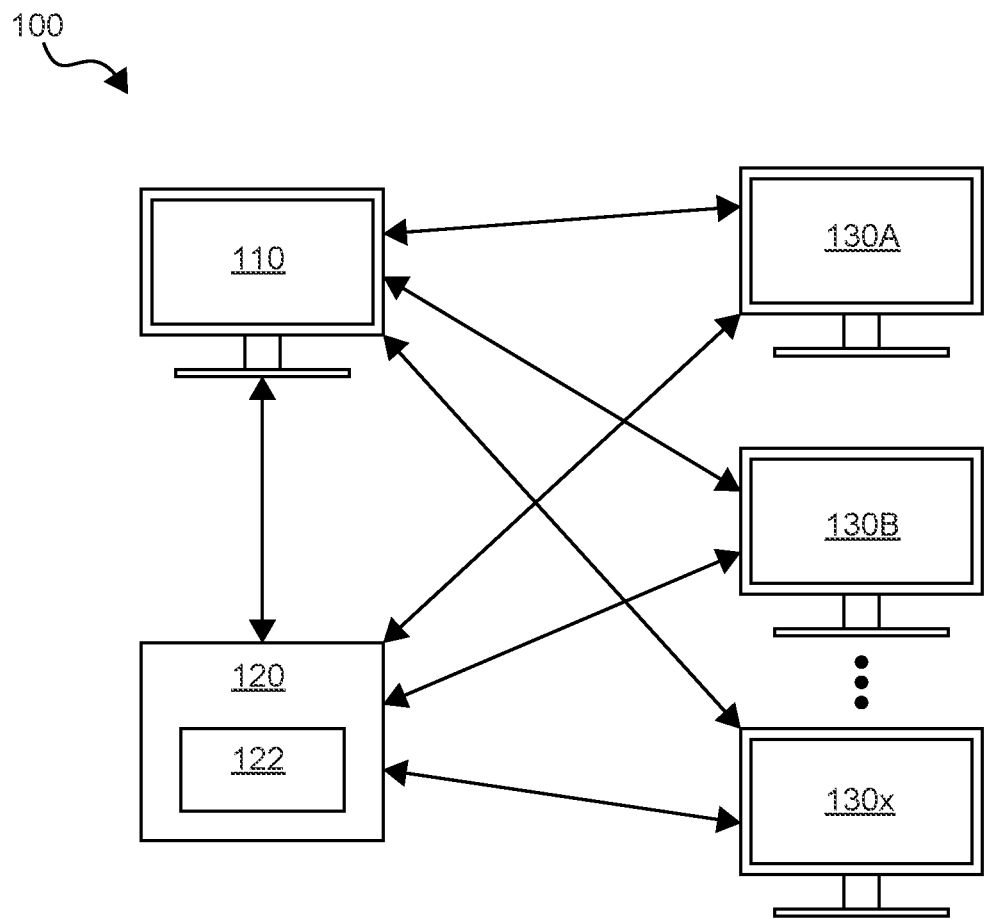
FIG. 1 is a diagrammatic overview of a system according to embodiments of the inventive subject matter.

FIG. 1 is a diagrammatic overview of the system 100 according to embodiments of the inventive subject matter.

As seen in FIG. 1, the system 100 includes a computing device 110 that is communicatively coupled with a database 120. The database 120 can be housed within computing device 110 and/or in a separate computing device that is communicatively coupled with the computing device 110. The database 120 stores one or more data sets 122 that can be accessed by users.

In FIG. 1, the computing device 110 is depicted as a single computing device. However, it is understood that, in embodiments, the computing device 110 can be made up of multiple computing devices that collectively carry out the functions associated with the computing device 110 discussed herein.

The system 100 also includes a plurality of user computing devices 130A-130*x* corresponding to users that can access some or all of the data in the data set(s) 122 as permitted by the computing device 110. As seen in FIG. 1, the user computing devices 130 may be able to connect to the database 120 directly and/or via the computing device 110.

Contemplated types of data set(s) 122 include, but are not limited to, a voter registration database, a shared document, a confidential records data set, a government data set, or a financial data set.

Figure 2:
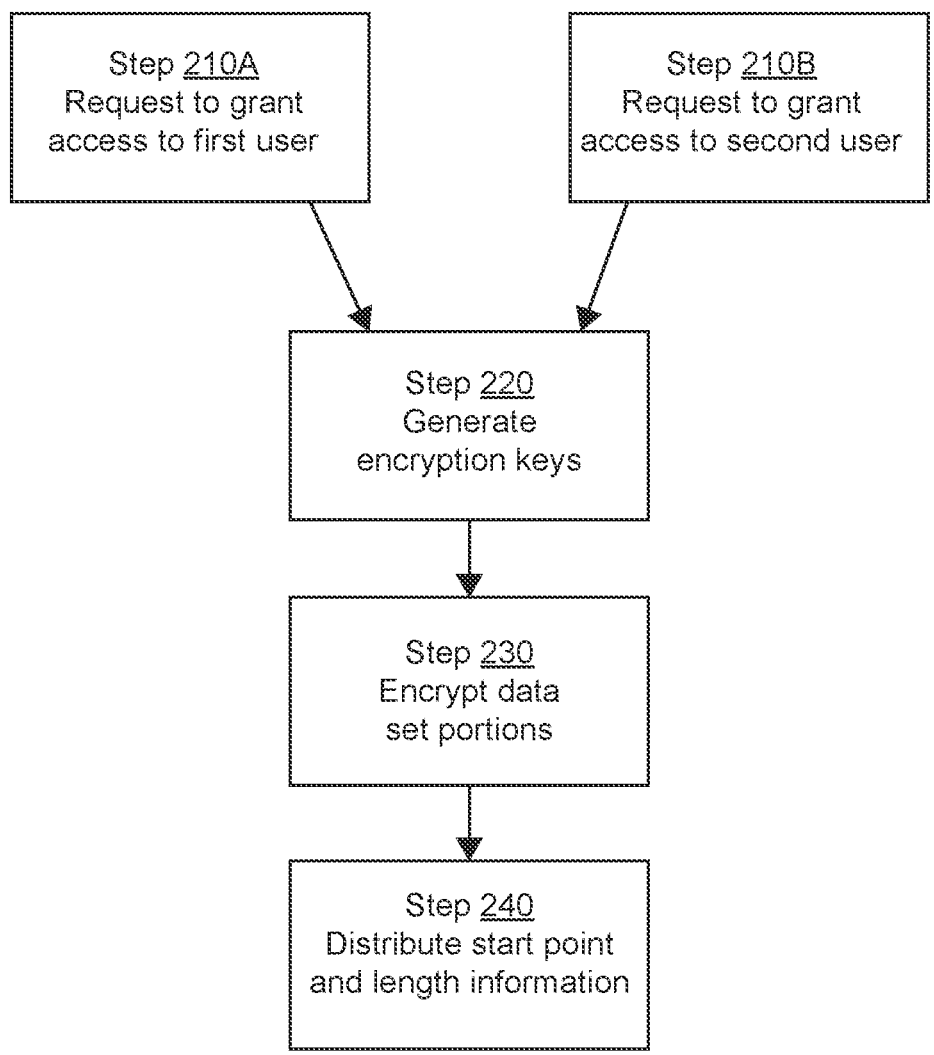
FIG. 2 is a flow chart of processes executed by the system, according to embodiments of the inventive subject matter.

FIG. 2 provides a flow chart of processes carried out by the system 100 according to embodiments of the inventive subject matter.

At step 210A, the computing device 110 receives a request to grant access data in the data set 122 to a first user computing device 130A. This request can include a designation of the portion or subset of the data set 122 that the user of the first user computing device 130A is authorized to access. Based on this request and the permissions, the computing device 110 establishes access to the requested portion of the data set 122 to the first user computing device 130A. "Access" can include, but is not limited to, the ability to view the authorized portion of the data set 122, add to the authorized portion of the data set 122, change/modify the authorized portion of the data set 122, and/or delete from the authorized portion of the data set 122.

Figure 3:
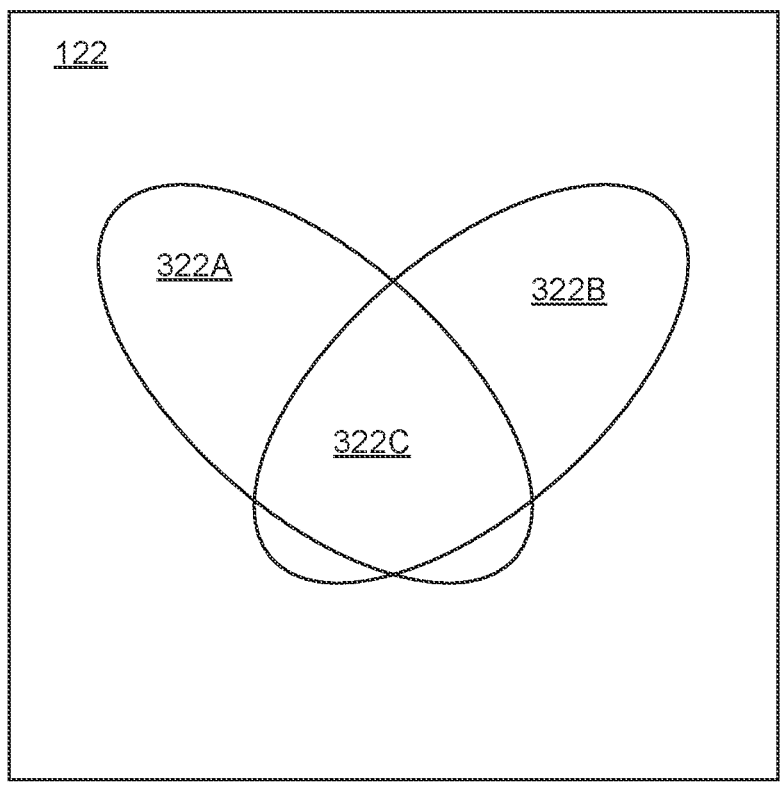
FIG. 3 is an example of portions of the data set, including overlapping portions.

At step 210B, which can be sometime before, concurrent with, or after the request at step 210A, the computing device 110 receives a request to grant access to data in the data set 122 to second user computing device 130B (which corresponds to a second user). This request can include a designation of the portion or subset of the data set 122 that the second user of the second user computing device 130B is authorized to access. The second subset of data from the data set is different from the first subset of data, except that it has an overlapping portion. This is illustrated in FIG. 3. Based on the requests and permissions, the computing device 110 establishes access to the second user computing device to access the corresponding portion of data set 122.

FIG. 3 provides an overview of the overlap between the portions of a data set 122 that can be accessed by the different users. Continuing with the above example, the first user computing device 130A is given access to a corresponding first portion 322A of the data set 122. The second user computing device 130B is given access to a corresponding second portion 322B of the data set 122. However, as seen in FIG. 3, there is an overlap 322C between the first and second portions 322A and 322B. This overlapping portion 322C corresponds to data that both the first and second users (via computing devices 130A and 130B) have access to.

After establishing the permissions at steps 210A and 210B, but before providing the computing devices 130A, 130B with the information needed to actually access their corresponding data set portions, the computing device 110 generates encryption keys for each of the portions 322A, 322B and the overlapping portion 322C at step 220. At step 230, the computing device 110 encrypts the first portion 322A with a first encryption key, the second portion 322B with a second encryption key and the overlapping portion 322C with a third encryption key.

In embodiments of the inventive subject matter, the first, second and third encryption keys are all derived based on an irrational number. In a variation of these embodiments, the irrational number is derived from a mathematical function that is known to the computing devices having access to the data file. In this example, the mathematical function is known to the computing device 110 and provided by the computing device 110 to the first and second user computing devices 130A, 130B.

In a further variation of these embodiments, the mathematical function is a function that comprises calculating the square root of a non-perfect square number.

The computing device 110 can have access to one or more mathematical functions stored on a memory (either within computing device 110 or on an externally located database communicatively coupled with the computing device 110). Preferably, the system stores a plurality of suitable mathematical functions.

Figure 4:
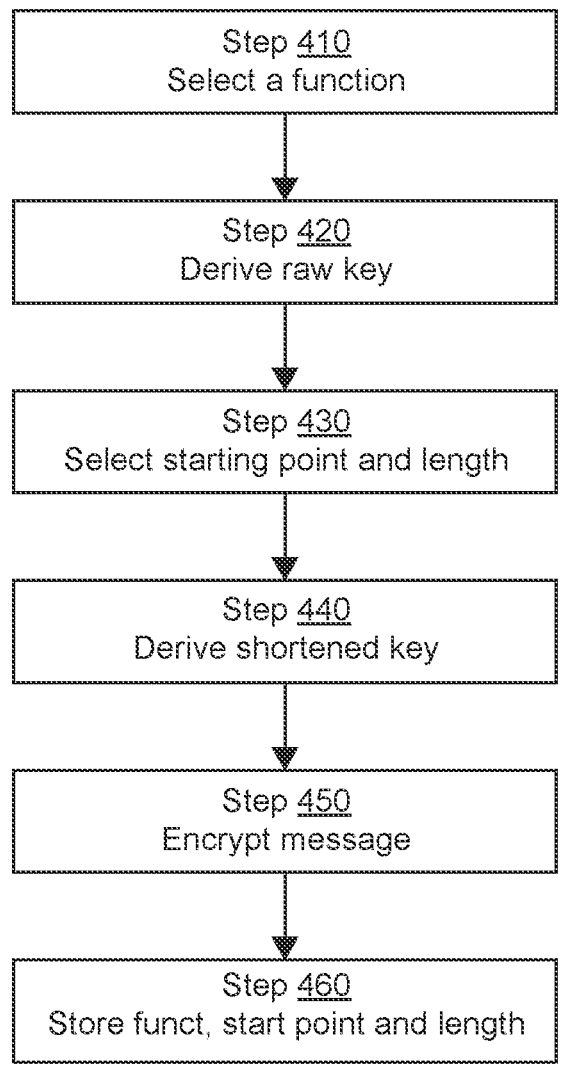
FIG. 4 is a flow chart in detail of the processes to generate encryption keys, according to embodiments of the inventive subject matter.

For each user, the computing device 110 generates the encryption and decryption keys in these embodiments as follows:

FIG. 4 illustrates the processes associated with generating the encryption keys and encrypting data of steps 220 and 230 in greater detail, according to embodiments of the inventive subject matter.

At step 410, the computing device 110 selects a mathematical function to be used to obtain a raw key. The function can be a mathematical function or algorithm as discussed further herein, in embodiments where multiple mathematical functions are stored. The function can be selected according to a pre-determined order or schedule. Alternatively, it can be randomly selected or user selected. The sending computing device 110 obtains the selected function from the stored functions in a memory, such as from a dedicated functions database.

At step 420, the computing device 110 solves the function to obtain a raw key. The raw key is either an irrational number or a transcendental number, having an infinite or near-infinite amount of decimal places. Thus, the function is a function whose output is an irrational number and/or a transcendental number. By using an irrational or transcendental number, the systems and methods of the inventive subject matter have the flexibility to obtain many encryption keys from the same function without repeating some or all of the encryption keys. Because irrational numbers do not have a pattern, the systems and methods of the inventive subject matter can ensure true randomness in the generation of cryptography keys. For example, the function can be to take the square root of a non-perfect square number. This results in an irrational number. In an illustrative example, the function to be solved can be the square root of 20.

At step 430, the computing device 110 selects a starting point and a length. The starting point designates a start digit in the decimals of the raw key. The length designates the number of digits following the start digit. The start digit and length are preferably integer values such that they identify a precise digit location and precise length.

At step 440, the computing device 110 applies the starting point and length to the decimals of the raw key to result in a shortened key. Thus, the shortened key is a key that starts at the start digit and contains the digits following the start digit according to the length.

Figure 5:
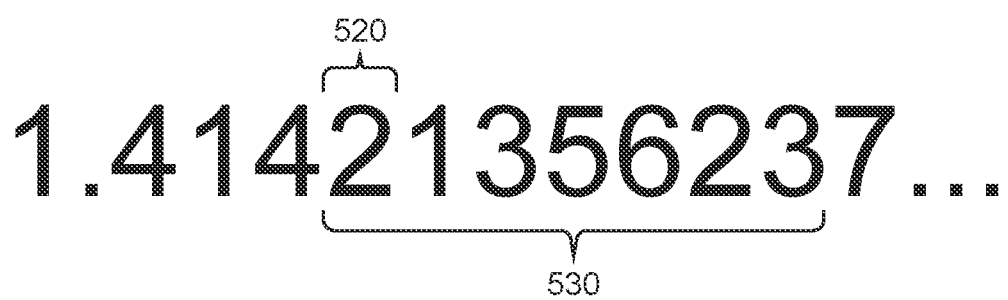
FIG. 5 provides a simplified illustrative example of the starting point and length applied to a raw key to generate the shortened key.

FIG. 5 provides a simplified illustrative example of the starting point and length applied to a raw key to generate the shortened key. The example of FIG. 5 includes a raw key 510 (in this simplified example, the square root of 2). The starting point 520 of "4" means the start digit is the fourth digit in the decimals of the raw key. In this, example, the starting point 520 of "4" means that the start digit is "2". The length 530, in this case of 7 characters, designates the length of the shortened key. Thus, in this case, the shortened key is "2135623". It should be noted that the starting point and length of FIG. 5 are for illustrative purposes only. The starting point can be any point along the decimals of the raw key and the length of any suitable length. The length can correspond to the length of the data to be encrypted, in certain embodiments.

At step 450, the computing device 110 can then encrypt a data set or portion with the shortened key. The shortened keys are the keys used for encryption and decryption.

At step 460, the computing device 110 then can store the selected function (or a designator of the selected function), the starting point and length in a memory for future reference.

The techniques used to generate and use the encryption/decryption keys using a single, shared mathematical function are described in greater detail in the inventor's own pending U.S. patent application, U.S. Ser. No. 17/018,582 filed Sep. 11, 2020, entitled "Method of Storing and Distributing Large Keys", which is incorporated herein by reference in its entirety.

For the processes of the inventive subject matter discussed herein, the computing device 110 selects a mathematical function to be used with a particular data set and then generates the keys for each portion of the data set from that mathematical function. Thus, for the first portion of the data set 322A, the computing device 110 executes the processes of FIGS. 4 and 5 for a mathematical function using a first starting point (and, if the keys can be of different lengths, a first length) to generate the first key. Likewise, for the second portion of the data set 322B, the computing device 110 executes the processes of FIGS. 4 and 5 using the same mathematical function but with a second starting point (and, if the keys can be of different lengths, a second length) to generate the second key. To generate the third key for the third portion of the data set 322C, the computing device 110 solves the same mathematical function and applies a third starting point (and, if the keys can be of different lengths, a third length).

It should be noted that the steps 220 and 230 are discussed with respect to the keys needed for the encryption of portions 322A, 322B, and 322C collectively for ease of understanding. However, it is not required that the generation of the keys and encryption of the data be performed simultaneously. Instead, the generation of the keys and encryption of the respective portions will be performed as user computing devices 130 are given access to data portions.

For example: The computing device 130A is first given access to the first data set portion 322A. The computing device 110 generates a corresponding encryption key for the entirety of data set 322A (because there is not yet an overlapping portion). At a later point, access is given to the second computing device 130B and the corresponding data set portion 322B. Because the creation of this access to the second computing device 130B creates the overlapping portion 322C, the computing device 110 at this point generates the encryption keys for this overlapping portion and encrypts this portion separately.

In order for the user computing devices 130 to be able to access their respective portions of the data set 122, the computing device 110 distributes the mathematical function to the computing devices 110 at a time prior to providing the actual access information to the respective authorized portions of the data set 122. As the authorized portions of the data set are defined for each user at steps 210A, 210B, the computing device 110 executes the processes of steps 220, 230 (including the processes of FIGS. 4 and 5) to encrypt those sections with the corresponding generated encryption keys.

At step 240, the start location and length information for each corresponding key is transmitted to the respective user computing devices 130A, 130B by the computing device 110. The respective user computing devices 130A and 130B can then repeat the processes of FIGS. 4 and 5 (except for the selection of the starting point and length, as those were provided) using the provided mathematical function and by applying the provided starting point and length to generate the corresponding decryption keys for the data set portion. As the portion of the data set changes (either by changes to the access permissions of the user or because of data set overlaps such as those of FIG. 3) and new keys are needed, the computing device 110 derives the new keys and provides the new starting point(s) and length(s) to the corresponding user computing device(s). Thus, at step 240 actual access to the data set portions 322A-322C is effectively granted to each corresponding user computing device 130A, 130B when they receive the information necessary to generate the decryption keys.

As the users finish accessing their respective sets of data, the computing device 110 proceeds to re-encrypt the data set portion(s) accessed by the user computing devices.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A method for updating a secure data file using a shared one-time pad among a plurality of users, comprising:
   granting, by a computing device, access to a first portion of a data set to a first user;
   granting, by the computing device, access to a second portion of the data set to a second user, wherein the first portion of the data file and the second portion of the data set share an overlapping portion of the data file;
   providing, by the computing device and to the first and second users, a mathematical function
   encrypting, by the computing device, the first portion minus the overlapping portion with a first key, wherein the first key is derived by:
      solving, by the computing device, the mathematical function to obtain an irrational number; and
      applying, by the computing device, a first starting location to the mantissa of the irrational number to obtain the first key;
   encrypting, by the computing device, the second portion minus the overlapping portion with a second key, wherein the second key is derived by:
      solving, by the computing device, the mathematical function to obtain the irrational number; and
      applying, by the computing device, a second starting location to the mantissa of the irrational number to obtain the second key; and
   encrypting, by the computing device, the overlapping portion with a third key, wherein the third key is derived by:
      solving, by the computing device, the mathematical function to obtain the irrational number; and
      applying, by the computing device, a third starting location to the mantissa of the irrational number to obtain the third key.

2. The method of claim 1, wherein the mathematical function comprises calculating the square root of a non-perfect square number.

3. The method of claim 1, wherein the data set comprises a shared document.

4. The method of claim 1, wherein the data set comprises a voter registration database.

5. The method of claim 1, wherein the step of granting access to a first user further comprises:
- decrypting, by a first user's computing device corresponding to the first user, the first portion minus the overlapping portion with a copy of the first key;
- decrypting, by the first user's computing device, the overlapping portion with a copy of the third key; and
- enabling editing, via the first user's computing device, of data within the decrypted first portion.

\* \* \* \* \*